United States Patent [19]

Shioji et al.

[11] Patent Number: 5,016,983

[45] Date of Patent: May 21, 1991

[54] DRIVE METHOD OF LIQUID CRYSTAL DEVICE

[75] Inventors: Mitsuaki Shioji, Yamatokoriyama; Kenichi Morimoto; Shinji Kato, both of Nara; Takeshi Nakamura, Yamatokoriyama; Nobuharu Nozaki, Kanagawa, all of Japan

[73] Assignees: Fuji Photo Film Co., Ltd., Kanagawa; Sharp Kabushiki Kaisha, Osaka, Japan

[21] Appl. No.: 372,152

[22] Filed: Jun. 27, 1989

Related U.S. Application Data

[63] Continuation of Ser. No. 946,196, Dec. 24, 1986, abandoned.

[30] Foreign Application Priority Data

Dec. 25, 1985 [JP] Japan ................................ 60-296040

[51] Int. Cl.$^5$ .............................................. G02F 1/13
[52] U.S. Cl. ..................................... 350/332; 350/333; 350/337; 350/339 R; 350/350 R
[58] Field of Search ............. 350/332, 337, 346, 350 R

[56] References Cited

U.S. PATENT DOCUMENTS

| 4,268,127 | 5/1981  | Oshima et al. ............. 350/337 |
| 4,323,471 | 4/1982  | Sethofer ..................... 350/350 R |
| 4,527,864 | 7/1985  | Dir ............................. 350/337 |
| 4,605,972 | 8/1986  | Hatanaka ..................... 350/332 |
| 4,621,900 | 11/1986 | Kiyonaga ..................... 350/332 |
| 4,622,162 | 11/1986 | Kimura et al. ............... 350/350 R |
| 4,629,290 | 12/1986 | Shionozaki et al. .......... 350/350 R |
| 4,670,182 | 6/1987  | Fujita et al. ................ 350/350 R |
| 4,671,616 | 6/1981  | Aoki et al. .................. 350/346 |

Primary Examiner—Stanley D. Miller
Assistant Examiner—Trong Phan

[57] ABSTRACT

A method for driving a twisted nematic type liquid crystal shutter, the liquid crystal shutter having a pair of transparent substrates held opposite to each other; a pair of patterned transparent electrodes each formed on the planes of the transparent substrates and arranged opposite to each other so that the overlapping parts of the patterns form display pixels; a pair of aligning film each formed on the pattern of the transparent electrode and on the plane; a liquid crystal material contained in a space between the transparent substrates; and a pair of transmission type polarizers each arranged on the outside plane of the transparent substrate which is counter to the plane on which the patterned transparent electrode is formed, comprising the steps of: applying an electric voltage to establish static or multiplex driving to the transparent electrodes so as to prevent the transmission of incident light when no image signal is received from an external apparatus; and preventing the application of the electric voltage to transparent electrodes which relate to the pixels selected by the image signal so as to permit the transmission incident light when the image signal is received from the external apparatus.

14 Claims, 4 Drawing Sheets

Fig. 1
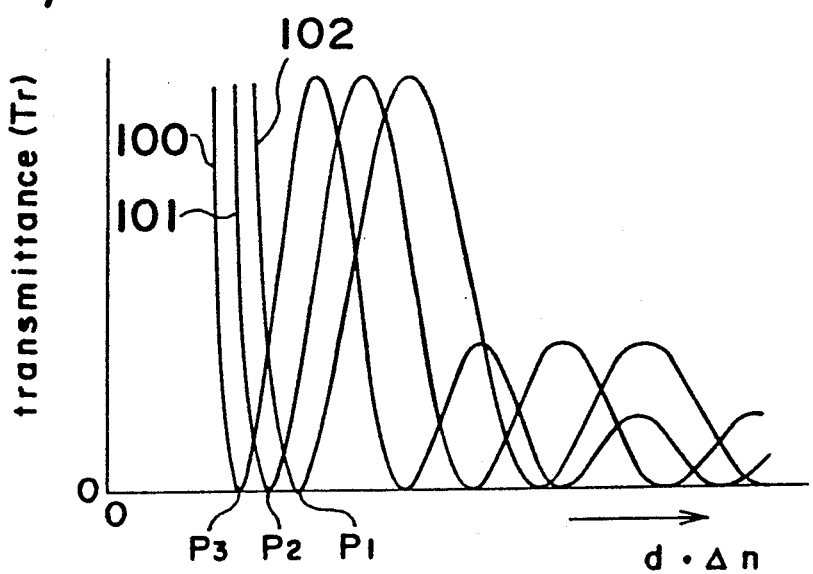
Fig. 2 Prior Art
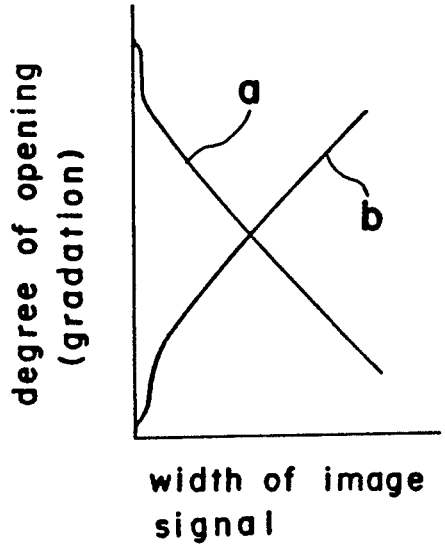
Fig. 3(a) Prior Art
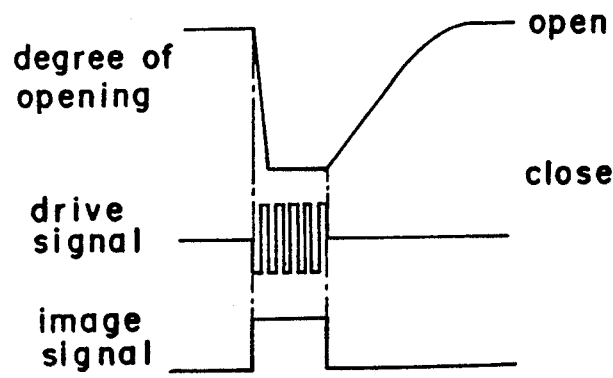
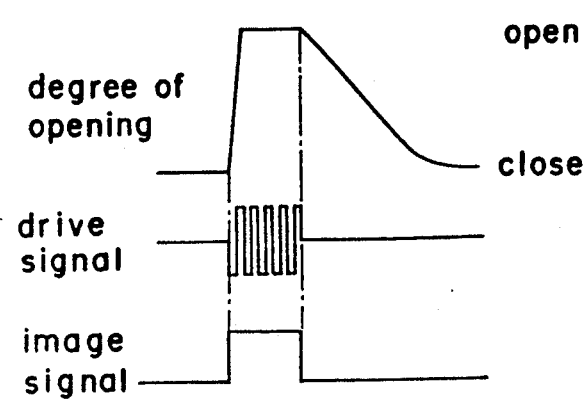
Fig. 3(b) Prior Art

DRIVE METHOD OF LIQUID CRYSTAL DEVICE

This application is a continuation, of application Ser. No. 06/946,196 filed on Dec. 24, 1989, now abandoned.

BACKGROUND OF THE INVENTION

The present invention relates to a method for driving a liquid crystal device and to a method for printing an image on a sensitive material by using the liquid crystal device as a light shutter.

DESCRIPTION OF THE PRIOR ART

Conventional light printers have been developed to use a liquid crystal device as a light shutter. However, these light printers produce a hard-copy of monochrome with no gradation. Such a liquid crystal light printer has been expected to compete with a laser printer and a light-emitting diode printer, since its development was mainly intended to improve the printing rate.

To obtain a hard copy of a color image with gradation, such as a television image, with a liquid crystal light printer, it is necessary to make the contrast of a liquid crystal shutter higher than 150 and to control the amount of the light being transmitted by a pixel per unit time or the gradation. However, the contrast of the conventional liquid crystal shutter is as low as ten and never exceeds twenty. Thus, the dynamic range for the amount of transmitted light is not enough, and a good half-tone image cannot be reproduced even by controlling the degree of duration of the opening for each pixel.

There are presently two types of methods for driving a liquid crystal shutter. These methods generally use: (1) a conventional TM mode drive method and (2) a dual frequency drive method. The former method (1) is simple with respect to the drive method and the level of the voltage being applied, and the contrast can be increased easily. However, the response time is too slow to utilize it with a printer. On the other hand, the latter method (2) has a fast response time enabling it to be utilized with a liquid crystal light printer using monochrome with no gradation. However, the high drive voltage and large frequency characteristic of this method complicate the drive circuit making the control of the gradation difficult. Therefore, the latter method (2) is difficult to utilize with a light printer using a monochromatic or color hard copy with gradation. As mentioned above, both methods have problems that must be solved before using the liquid shutter with a printer for a monochromatic or color hard copy with gradation.

Another problem encountered when using a liquid crystal light shutter is described below. FIG. 1 shows the relation between the transmitance Tr, the wavelength, the cell thickness d, and the anisotropy $\Delta n = (n_{\|} - n_{\perp})$ of the refractive index of the liquid crystal, wherein 100, 101 and 102 are transmittance curves representing blue, green and red, respectively. The curves are defined by the following equation (refer G. H. Gooch and H. A. Tarry, J. Phys. D8, 1575(1975):

$$Tr = \sin^2(\pi/2[1 + (2d^*\Delta n/\lambda)^2]^{\frac{1}{2}})/(1 + (2d^*\Delta n/\lambda)^2).$$

The values of d and $\Delta n$ are characteristic of each liquid crystal shutter, thereby the abscissa $d^*\Delta n$ is fixed if a liquid crystal shutter is specified. The values of $d \cdot \Delta n$, where the transmittance Tr has the lowest value, vary with the light's wavelength $\lambda$. It is also impossible, in principle to set a value of $d^*\Delta n$ to prevent the transmission of light at any wavelength. However, a portion of the incident light representing some of the wavelengths will inevitably leak. This leaked light will not have an even distribution of wavelength. This unevenness will depend largely on $d^*\Delta n$. Therefore, an unevenness of color can be caused by even a little difference in the cell thickness d. The leaked light will decrease the contrast of the image to be printed or the dynamic range of the liquid crystal shutter.

As shown in FIG. 1, or by solving the above-mentioned equation, the transmittance Tr, if no voltage is applied to a liquid crystal shutter, depends on the wavelength. This dependence is much larger in the method for driving a negative type liquid crystal shutter than in a positive type, wherein the transmission light is prevented when a voltage is applied to the display portion of the liquid crystal shutter while the light is transmitted when no voltage is applied. However, in the method for driving the positive type liquid crystal shutter, the matching of the photosensitivity of the sensitive material and the characteristic of the liquid crystal shutter is imperfect, thereby making it difficult to control the gradation.

This defect will be explained further by referring to FIG. 2, 3(a), and 3(b). FIG. 2 shows the relationship between the degree of opening (gradation) of a liquid crystal shutter and the width of a pulse being applied or the number of pulses being applied. In FIG. 2, curve "a" represents the characteristics of a positive type liquid crystal shutter wherein a polarizer and an analyzer are arranged such that their absorption axes are perpendicular to each other. This causes the transmission of light at each of pixels to be prevented when liquid crystal drive signals are applied. Curve "b", in FIG. 2, represents the characteristics of a negative type liquid crystal shutter wherein the absorption axes of a polarizer and an analyzer are made parallel to each other. The transmission of light is prevented when no voltage is applied to the electrodes; however, light passes through the shutter when a positively logic liquid crystal drive signal is applied.

FIGS. 3(a) and 3(b) show the actions of the drive modes corresponding to the curves "a" and "b", respectively. In the positive type liquid crystal display, the transient response from an open state to a closed state is fast while the transient from the closed state to the open state is slow. On the contrary, in a negative type liquid crystal display, the transient response from a closed state to an open state is fast while the transient from the open state to a closed state is slow. In FIG. 3(a), if the width of the image signal is changed, the degree of the opening of the shutter changes rapidly within the range of narrow pulse widths, as shown by the curve "a" in FIG. 2, thereby making the control of gradation difficult. In FIG. 3(b), if the signals similar to those in FIG. 3(a) are applied, the degree of the opening of the shutter also changes rapidly when the width of the image signal is small.

Furthermore, if the negative type liquid crystal shutter is driven by negative logic signals, the level representing the degree of the opening of the shutter cannot be decreased low enough to reach the closed state, as shown in FIG. 4, thereby making the contrast low.

Also, only a sensitive material of monochrome can be used in the conventional liquid crystal light printer because the light printer uses a monochrome light source, such as a fluorescent light, with no converting means such as a color filter.

Thus, the conventional liquid crystal light printer can only record a monochrome image with no gradation. Even if the source is white light and a color sensitive material is used, a color print cannot be obtained since the conventional negative type liquid crystal display drive method does not produce enough contrast to establish the gradation of the image. As for the conventional positive type liquid crystal display drive method, it is still difficult to control the gradation using a white source and color sensitive material.

SUMMARY OF THE INVENTION

An objective of the present invention is to provide a liquid crystal shutter drive method which can increase the contrast and facilitates an easy control of the gradation.

Another objective of the present invention is to provide a method for controlling the gradation of the color image to be printed.

According to the present invention, there is provided a method for driving a twisted nematic type liquid crystal shutter, the liquid crystal shutter having a pair of transparent substrates held opposite to each other, a pair of patterned transparent electrodes each formed on the planes of the transparent substrates and arranged opposite to each other so that the overlapping parts of the patterns form display pixels; a pair of aligning film each formed on the patten of the transparent electrode and on the plane; a liquid crystal material contained in the space between the transparent substrates; and a pair of transmissive type polarizers each arranged on the outside plane of the transparent substrate which is counter to the plane on which the patterned transparent electrode is formed, comprising the steps of: applying an electric voltage to establish static or multiplex driving of the transparent electrodes so as to prevent the transmission of incident light when no image signal is received from an external apparatus; and preventing the application of the electric voltage to transparent electrodes which relate to the pixels selected by the image signal so as to permit the transmission of incident light when the image signal is received from the external apparatus.

According to the present invention, there is further provided a method of recording an image with gradation using a liquid crystal light printer. The liquid crystal light printer comprises a twisted nematic type liquid crystal shutter, as mentioned above; a light source for illuminating the liquid crystal shutter; a sensitive material positioned on the opposite side of the liquid crystal shutter, away from the light source; means for supporting the sensitive material; and means for driving the liquid crystal shutter with the static or multiplex drive in response to the image signal received from an external apparatus; the improvement comprising the steps of: using a positive type sensitive material; applying an electric voltage to the static or multiplex drive of the transparent electrodes so as to shade the light when no image signal is received from an external apparatus; and preventing the application of the electric voltage to the static or multiplex drive of the transparent electrodes which relate to the pixels selected by the image signal so as to permit the transmission of light when the image signal is received from the external apparatus.

An advantage of the present invention is that the gradation can be controlled easily.

Another advantage of the present invention is that the matching between the liquid crystal device and the positive-type photosensitive material can be improved upon controlling the gradation.

BRIEF DESCRIPTION OF THE DRAWINGS

Other objectives and advantages of the present invention will become more apparent from the detailed description of the preferred embodiments with reference to the accompanying drawings wherein:

FIG. 1 is a graph of the light transmittance of the three colors of a liquid crystal shutter in relation to the cell thickness and the anisotropy of the refractive index;

FIG. 2 is a graph of the gradation of a prior art liquid crystal drive method in relation to the width of the image signal;

FIG. 3($a$) and 3($b$) are time charts showing different drive methods for a liquid crystal shutter;

DESCRIPTION OF PREFERRED EMBODIMENTS

Figure 4:
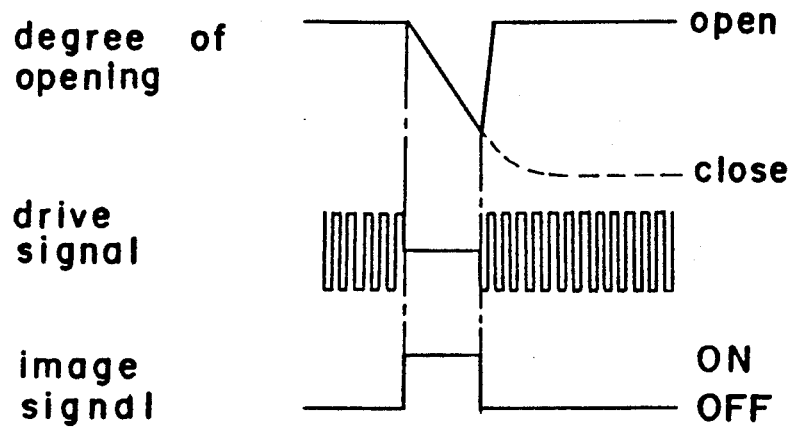
FIG. 4 is a time chart showing the drive method for a liquid crystal shutter according to the present invention.
Figure 5:
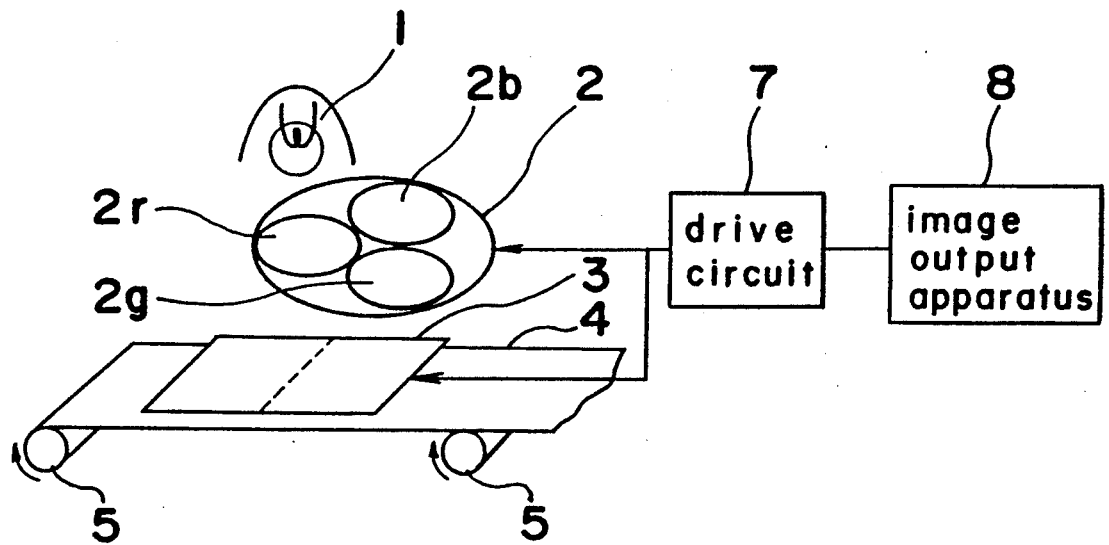
FIG. 5 is a schematic perspective view of a liquid crystal light printer.

Referring now to the drawings wherein like reference numerals designate corresponding parts throughout the drawings, FIG. 5 shows a schematic example of a liquid-crystal light color printer according to the presennt invention. To simplify the drawing, an optical system for convergence and a system for image formation are omitted from FIG. 5 because these systems are known. In FIG. 5, a light source 1 is a point source comprising a 150W halogen lamp. A line or plane source can also be used. The light source 1 radiates white consisting of the wavelengths $\lambda$ from 430 to 680 nm.

The light source 1 may also be a composite of three sources which radiates the three primary colors of light. In the present invention, the three sources are moved successively or inserted into the light path according to the image signals. The three colors are obtained by dividing the incident light into the three primary colors. These three colors are then provided successively onto the shutter. The light source 1 has a brightness controller, a temperature controller, a heat-insulating filter and/or a heat ray mirror if necessary which are also omitted from FIG. 5.

A color filter 2 consists of three filters for each of the primary colors: a filter 2$r$ which transmits red light ($\lambda=650$ nm) selectively, a filter 2$g$ which transmits green light ($\lambda=550$ nm) selectively and a filter 2$b$ which transmits blue light ($\lambda=450$ nm) selectively. The three filters 2$r$, 2$g$, 2$b$ are inserted successively in the light path to give time-shared image information of the three colors. The color filter 2 can be omitted, if necessary, by using individual light sources of the three colors of red, green and blue. If the color filter 2 is used to control the width of the wavelength of the incident light upon the sensitive material, the color of the light source 1 and the color filter 2 should agree with each other.

A liquid crystal shutter (liquid crystal display) 3 is a liquid crystal shutter array, but a liquid crystal shutter matrix can also be used. Display parts (pixels) of the liquid crystal shutter 3 are connected via transparent electrodes to a drive circuit 7 which receives image information from an output apparatus 8. The pixels are static or multiplex driven according to image information. The degree of the opening or its duration is controlled stepwise by varying the number or the width of the pulses being applied to each of the pixels so that the amount of light which is transmitted by each pixel is controlled. This amount represents the gradation.

The liquid crystal shutter 3 is a positive type display, wherein no light is transmitted when an electric voltage is applied to the display part of the liquid crystal shutter 3, while light is transmitted when no electric voltage is applied. A liquid crystal shutter 3 may have a UV filter if necessary.

The sensitive material 4 is photographic paper or sensitized paper. It may also be a photosensitive material. The color image is formed on the sensitive material 4 according to the incident light from the light source 1. In this embodiment, the color sensitive material is silver salt. The sensitive material 4 is supported on a support means 5.

The drive circuit 7 drives the liquid crystal shutter 3 according to the image signal received from the image output apparatus 8. The image output apparatus may be an image scanner. The drive method will be explained later.

Figure 6:
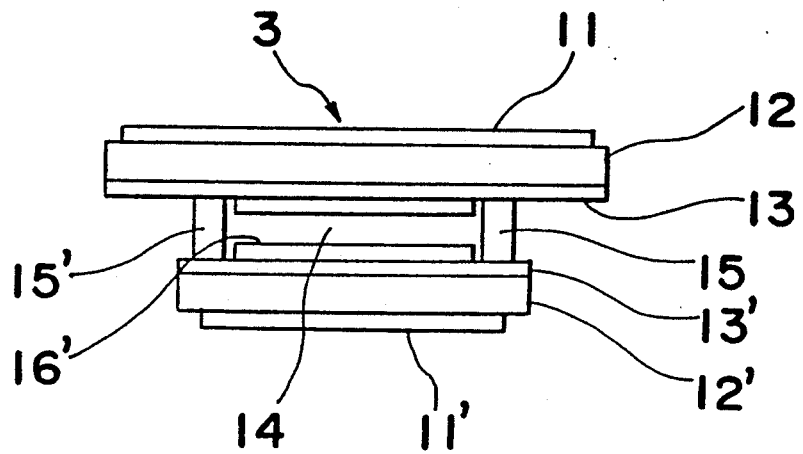
FIG. 6 is a schematic cross-section of a liquid crystal shutter.

FIG. 6 is a cross-section of a positive type liquid crystal shutter 3. Two transparent substrates 12, 12' are arranged parallel to each other so that planes on which transparent electrode patterns 13, 13' of indium-tin oxide are formed are opposite to each other. Overlapping parts of the transparent electrode pattern 13, 13' form a composite of display parts (pixels) which are square and arranged in a staggered pattern in two lines. The pixels may be square, rectangular or any definite form, and may be arranged in one or more lines in a lattice or staggered pattern. Each pixel is connected to the drive circuit 7 via transparent electrode pattern 13, 13'.

The drive circuit 7 drives each pixel using the static drive or multiplex drive method by applying electric voltage to the liquid crystal material 14 held between the substrates 12, 12' according to the image signal received from the image output apparatus 8, thereby forming a display pattern in the liquid crystal shutter 3. This part, except the pixels, is shaded with a mask pattern (not shown).

Seal materials 15 and 15' are used in order to seal the liquid crystal material 14 between the transparent electrode pattern 13, 13'.

Aligning film 16 and 16', made of an organic material, are applied on the transparent electrode pattern 13 and 13'. The aligning directions of the aligning films 16 and 16' are parallel to the absorption axes of polarizers 11 and 11' set outside the transparent substrates 12 and 12', respectively.

The transmission-type polarizers 11 and 11' are arranged so that the absorption axes are perpendicular to each other. The wavelenght dependence of the transmittance of the polarizers 11, 11' in this embodiment is 10% or less in a wavelength region between 430 and 680 nm, the parallel transmittance $T_\parallel$ is about 18.6% and the perpendicular transmittance $T_{195}$ is about 0.016% in the same wavelength region. The degree of polarization $V = ((T_{81} - T_{195})/(T_{81} + T_{195})) \times 100$ is about 99.98%. It is preferable for the polarizers, to increase the contrast, that the wavelength dependence of the transmittance in the wavelength region to be below 10%, that the parallel transmittance $T_{81}$ to be more than 15%, and the perpendicular transmittance $T_{195}$ to be less than 0.007% in the same wavelength region. The degree of polarization $V$ is 99.96% or more.

The liquid crystal material 14 used in this embodiment has viscosity n of about 13 cps at 25° C. and the transition temperature $T_{NI}$ between the nematic and isotropic phase is about 60° C. It is preferable, for the liquid crystal material, that the viscosity n is 70 cps or less at 25° C., that the threshold voltage $V_{th}$ is 3 V or less, and that the transition temperature $T_{NI}$ is about 55° C. or more. If the viscosity n is over 70 cps, the decay response becomes slow, and if the threshold voltage $V_{th}$ is over 3 V, the rise response becomes slow. Further, it is preferable to use the liquid crystal shutter 3 at a high temperature because the lower viscosity. Then, an operating range of temperatures below 55° C. would be too narrow for a practical use.

Figure 7:
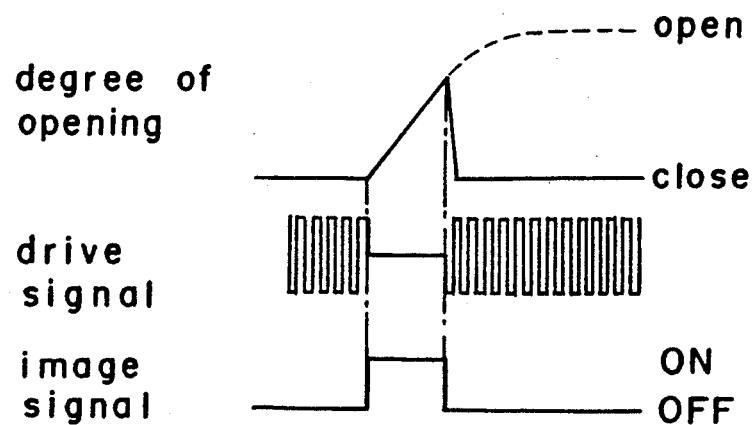
FIG. 7 is a time chart showing another drive method for a liquid crystal shutter according to the present invention.

The liquid crystal shutter 3 is brought in a static drive with the applied voltage (the effective voltage $V_{rms}$) of 15 V having a drive frequency of 5 kHz. As shown in FIG. 7, the drive signal is applied to the electrodes 13, 13' so as to close the light shutter when no image signal is received. When an image signal is selectively provided at each pixel allowing light to be transmitted, the application of the liquid crystal drive signal is selectively stopped for each pixel. Then, the light is shuttered into the pixels to which signals are prevented from being applied. This type of a drive is called a negative logic drive.

The signal sent to the liquid crystal shutter 3 is image information which is time-shared between the three colors. This image information consists of a number of pulses or a pulse with a variable width. The liquid crystal drive signal is a square wave, and the number of the pulses or the width of a pulse corresponds to the intensity of the color. The stop time of the voltage being applied is controlled stepwise according to the intensity of the color by varying the number of the pulses or the width of the pulse. In the positive-type display of a liquid crystal shutter, the transient response from the open state to the closed state is fast, whereas the transition from the closed state to the open state is slow. Because the transition from the closed state to the open state is slow, the degree of opening or the open time is controlled by varying the signal input time, and the gradation is controlled by varying the amount of the light which is transmitted through pixels.

Figure 8:
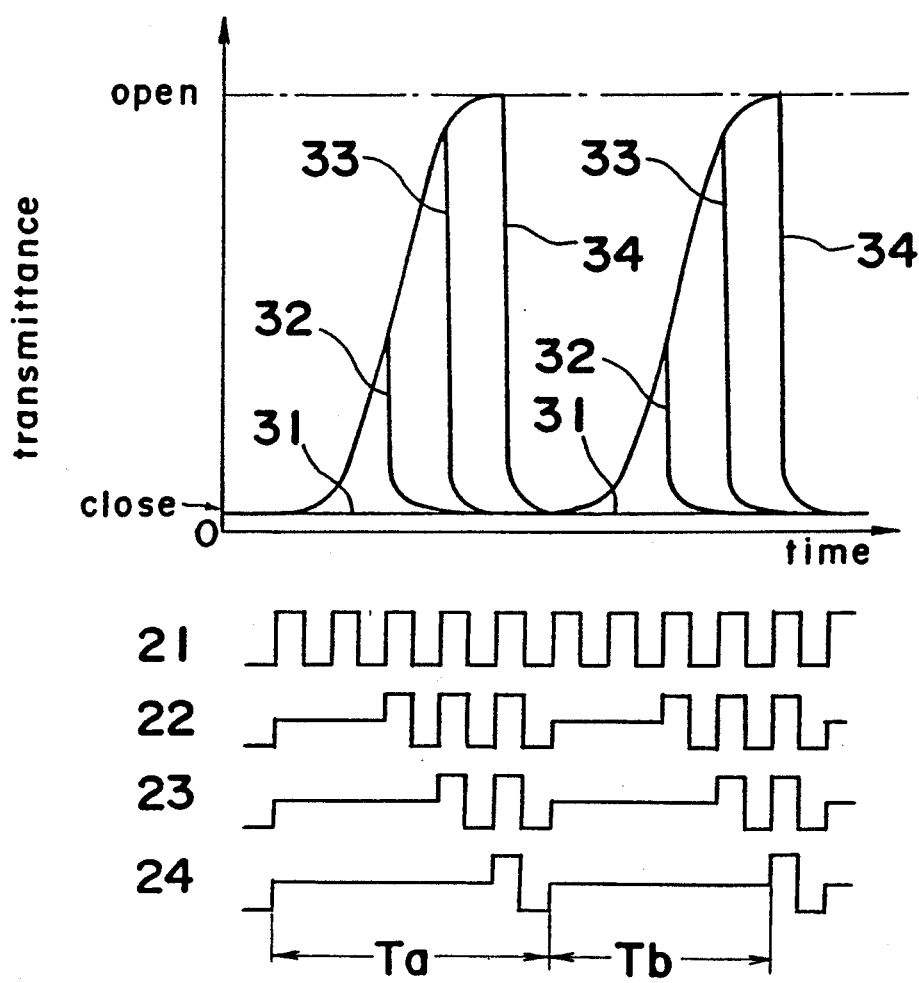
FIG. 8 is a time chart showing the relation between the transmittance and liquid crystal drive signal.

FIG. 8 shows a schematic example of the control of gradation. The liquid crystal drive signals 21, 22, 23 and 24 each correspond to green light of a different intensity, and the stop time in each signal is controlled according to the intensity by varying a signal input time $T_b$ with respect to the unit write time $T_a$.

Transmittance curves 31, 32, 33 and 34 show that the transmittance varies with time according to the liquid crystal drive signals 21, 22, 23 and 24, respectively. The area enclosed by the transmittance curves 31, 32, 33 or 34 shows the integrated amount of transmitted light. The curve 31 is flat because te pixel is closed completely. The dynamic range is defined by a ratio of the area enclosed by a transmittance curve to that enclosed by the transmittance curve 31. The contrast is defined as a ratio of the transmittance in a completely open state to that in a completely closed state. In this embodiment, the dynamic range is about 200 or more, and the contrast is about 500.

Figure 9:
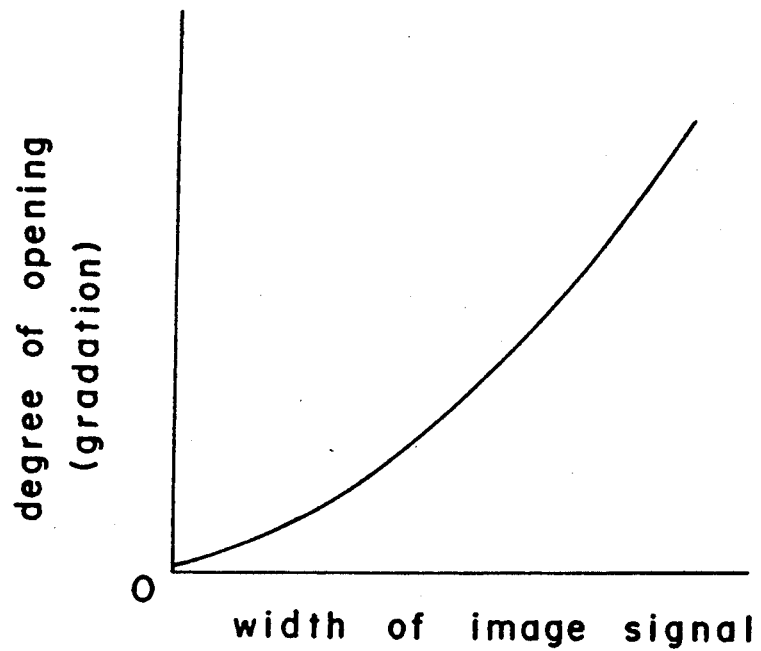
FIG. 9 is a graph of the gradation plotted against the width of the image signal.

FIG. 9 shows the degree of the opening (the gradation) of a liquid crystal shutter, according to an embodiment, plotted against the width of the image signal. The degree of opening changes rather slowly when the width of the image signal is small, while is changes almost linearly when the width of the image signal is in an intermediate region. On the contrary, as shown in FIG. 2, the degree of opening in a prior art shutter changes sharply when the width of the image signal is small.

If the sensitive material 4 which has the ratio of contrast of 1:50 or more is used, the contrast of the image will be improved.

Figure 10:
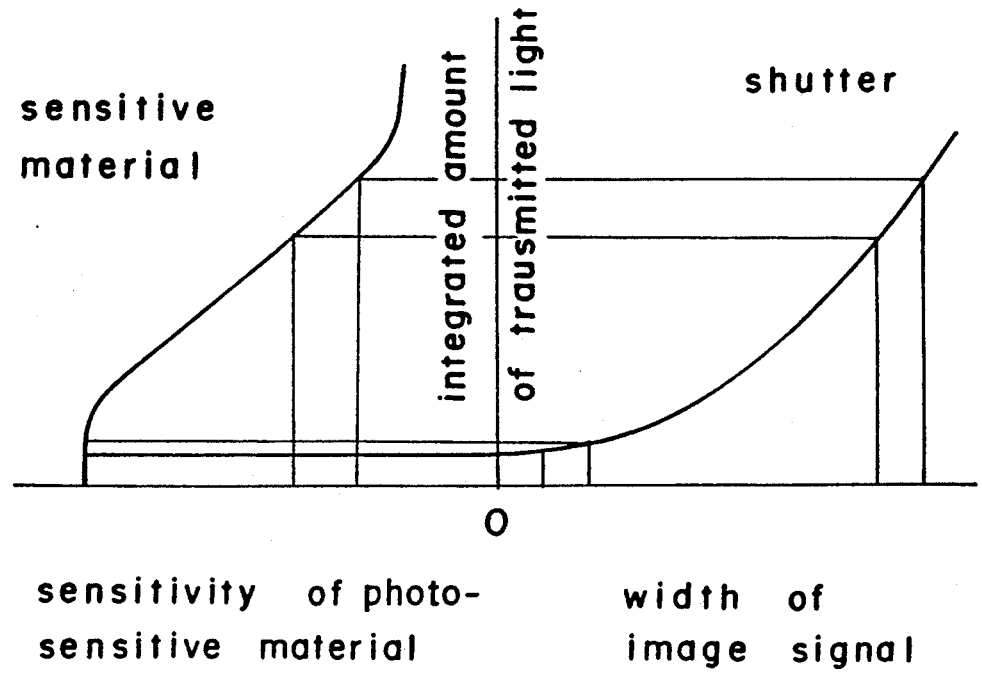
FIG. 10 is a graph showing the matching of the integrated amount of transmitted light against the sensitivity of sensitive material.

FIG. 10 shows the matching of the gradation of a positive type liquid crystal shutter using a negative-logic drive with the sensitivity of a positive type sensitive material. In the positive type sensitive material, a part is bright of dark according to the incident light received or not received on the part.

Even for the same width image signal, a change in the intensity is expressed minutely and coarsely on the photosensitive material when the width of the image signal is small and large, respectively. Therefore, the gradation can be controlled very favorably for an expression of an image because it is desirable in general to express parts minutely where the intensity is large.

While the preferred embodiments have been described, modifications and variations being obvious to those skilled in the art are possible without departing from the spirit of the invention. The scope is therefore to be determined solely by the appended claims.

What is claimed is:

1. A method for driving a liquid crystal shutter comprising the steps of:

utilizing a liquid crystal shutter having a pair of transparent substrates positioned opposite to each other, a pair of transparent electrodes each formed on a plane of the transparent substrate to form a pattern and arranged opposite to each other so that overlapping parts of the patterns form a desired display area, a pair of aligning films each applied on the patterned transparent electrodes and on a portion of the transparent substrate not covered by the pattern, a liquid crystal material contained in a space between the transparent substrates, the liquid crystal material having a viscosity of 70 cps or less at 25° C., the liquid crystal material also having a threshold voltage of 3 volts or less and a transition temperature of 55° C. or more for changing from a nematic phase to an isotropic phase, and a pair of polarizers, the polarizers being of a transmission type, each polarizer being formed on a respective transparent substrate opposite the plane of the patterned transparent electrode from said liquid crystal material, the polarizers having a wavelength transmittance dependence of $+/-10\%$ or less for light having a wavelength between 430 and 680 nm, the transmittance ($T_p$) in a parallel direction being 15% or more, the transmittance ($T_t$) in a transverse direction being 0.007% or less, and degree of polarity, $\{(T_p-T_t)/(T_p+T_t)\}*100$, being 99.96% or more;

applying an electric voltage to the transparent electrodes to prevent reception of incident light by using a static or multiplex drive when no image signal is received from an external apparatus; and stopping the application of the electric voltage to the transparent electrodes which are related to the pixels selected according to the image signal, thereby transmitting the incident light when the image signal is received from the external apparatus.

2. The method as claimed in claim 1, wherein the electric voltage for driving the liquid crystal shutter consists of square wave pulses and the nummber of square wave pulses is controlled stepwise to vary the stop time of the application of the electric voltage according to the image signal.

3. The method as claimed in claim 1, wherein the electric voltage for driving the liquid crystal shutter consists of square wave pulses, each square wave pulse having a width, and the width of each square wave pulse is controlled stepwise to vary the stop time of the application of the electric voltage according to the image signal.

4. The method as claimed in claim 1, wherein an area not including the pixels of the liquid crystal shutter is shaded with a mask pattern.

5. A method for recording an image with gradation of a liquid crystal light printer comprising the steps of:

utilizing a liquid crystal shutter, the liquid crystal shutter having a pair of transparent substrates positioned opposite to each other, a pair of transparent electrodes each formed on a plane of the transparent substrate to form a pattern and arranged opposite to each other so that overlapping parts of the patterns form pixels for a display, a pair of aligning films each applied on the patterned transparent electrodes and on the portion of the transparent substrate not covered by the pattern, a liquid crystal material of a positive type contained in a space between the transparent substrates, the liquid crystal material having a viscosity of 70 cps or less at 25° C., the liquid crystal material also having a threshold voltage of 3 volts or less and a transition temperature of 55° C. or more for changing from a nematic phase to an isotropic phase, and a pair of polarizers, the polarizers being formed on the respective transparent substrate opposite the plane of the patterned transparent electrode from said liquid crystal material, the polarizers having a wavelength transmittance dependence of $+/-10\%$ or less for light having a wavelength between 430 and 680 nm, the transmittance ($T_p$) in a parallel direction being 15% or more, the transmittance ($T_t$) in a transverse direction being 0.007% or less, and degree of polarity, $\{(T_p-T_t)/(T_p+T_t)\}*100$, being 99.96% or more; a light source for illuminating the liquid crystal shutter; a sensitive material positioned on an opposite side of the liquid crystal shutter from a side from which the light source is positioned; means for supporting the sensitive material; and means for driving the liquid crystal shutter in a static or multiplex drive according to an image signal received from an external apparatus;

applying an electric voltage to the transparent electrodes to prevent reception of light by using the static or multiplex drive when no image signal is received from an external apparatus; and stopping the application of the electric voltage to the transparent electrodes which are related to the pixels selected according to the image signal, thereby transmitting light when the image signal is received from the external apparatus.

6. The method as claimed in claim 5, wherein the electric voltage for driving the liquid crystal shutter consists of square wave pulses, each square wave pulse having a width, and the width of each square wave pulse is controlled stepwise to vary the stop time of the application of the electric voltage according to the image signal.

7. The method as claimed in claim 5, wherein the electric voltage for driving the liquid crystal shutter consists of square wave pulses, each square wave pulse having a width, and the width of each square wave pulse is controlled stepwise to vary the stop time of the application of the electric voltage according to the image signal.

8. The method as claimed in claim 5, wherein an area not including the pixels of the liquid crystal shutter is shaded with a mask pattern.

9. The method as claimed in claim 5, wherein the sensitive material has a contrast ratio of the amount of light to exposure of 1:50 or more.

10. The method as claimed in claim 9, wherein the light source emits light having at least three successive regions of wavelength and the sensitive material is a color sensitive material.

11. The method as claimed in claim 9, wherein the light source emits white light having wavelengths between 430 and 680 nm, the light source has filter means for selectively transmitting the light in a specified wavelength region and the sensitive material is a color sensitive material.

12. The method as claimed in claim 9, wherein the sensitive material includes silver salts.

13. A liquid crystal shutter device comprising:
a liquid crystal shutter;
the liquid crystal shutter including,
  a pair of transparent substrates positioned opposite each other,
  a pair of transparent electrodes each formed on a plane of said transparent substrate to form a pattern and arranged oppposite each other so that overlapping parts of the patterns form a display area,
  a pair of aligning films each applied on the patterned transparent electrodes and on a portion of the transparent substrate not covered by the pattern,
  a liquid crystal material contained in a space between the transparent substrates, the liquid crystal material having a viscosity of 70 cps or less at 25° C., a threshold voltage of 3 volts or less, and a transition temperature of 55° C. or more for changing from a nematic phase to an isotropic phase, and
  a pair of transmission type polarizers being formed on the transparent substrate opposite the plane of the patterned transparent electrode from said liquid crystal material, the polarizers having a wavelength transmittance dependence of $+/-10\%$ or less for light having a wavelength between 430 and 680 nm, the transmittance ($T_p$) in a parallel direction being 15% or more, the transmittance ($T_t$) in a transverse direction being 0.007% or less, and degree of polarity, $\{(T_p-T_t)/(T_p+T_t)\}*100$, being 99.96% or more; and drive means for applyiing an electric voltage to said transparent electrodes when no image signal is received from an external apparatus;

said drive means stopping the application of the electric voltage to said transparent electrodes when an image signal is received from the external apparatus.

14. A liquid crystal light printer, comprising:
a liquid crystal shutter;
said liquid crystal shutter including,
  a pair of transparent electrodes each formed on a plane of one of said transparent substrates to form a pattern and arranged opposite to each other so that overlapping parts of the patterns form pixels for a display,
  a pair of aligning films each applied on the patterned transparent electrodes and on a portion of the transparent substrate not covered by said pattern,
  a positive type liquid crystal material positioned in a space between said pair of transparent substrates,
  said liquid crystal material having a viscosity of 70 cps or less at 25° C., a threshold voltage of 3 volts or less, and a transition temperature of 55° C. or more for changing from a nematic phase to an isotropic phase, and
  a pair of polarizers,
  said polarizers being formed on respective plane of each transparent substrate opposite the plane of the patterned transparent electrode,
  said polarizers having a wavelength transmittance dependence of $+/-10\%$ or less for light having a wavelength between 430 and 680 nm, the transmittance ($T_p$) in a parallel direction being 15% or more, the transmittance ($T_t$) in a transverse direction being 0.007% or less, and a degree of polarity, *100, being 99.96% or more light source means for illuminating said liquid crystal shutter;

a sensitive material positioned on an opposite side of said liquid crystal shutter from a side from which said light source means is positioned;

support means for supporting said sensitive material; and drive means for driving said liquid crystal shutter by using a static or multiplex drive method according to an image signal received from an external apparatus;

said drive means applying an electric voltage to aid transparent electrodes to prevent reception of light by using the static or multiplex drive method when no image signal is received from said external apparatus, thereby causing a dynamic range of 200 or more to be obtained;

said drive means preventing the application of said electric voltage to said transparent electrodes which are related to pixels selected according to said image signal, thereby transmittinng light when said image signal is received from said external apparatus.

* * * * *